Aug. 14, 1956  T. D. H. ANDREWS  2,759,138
CHARGING SYSTEM FOR ELECTROSCOPES
Filed Jan. 21, 1953

Inventor
THOMAS DESMOND
HUDSON ANDREWS
By
Attorney

United States Patent Office 2,759,138
Patented Aug. 14, 1956

2,759,138

CHARGING SYSTEM FOR ELECTROSCOPES

Thomas D. H. Andrews, Cheltenham, England, assignor to Dowty Nucleonics Limited, a corporation of Great Britain Application January 21, 1953, Serial No. 332,366

2 Claims. (Cl. 320—1)

This invention relates to charging systems for electroscopes and is particularly concerned with a charging system in which a generator is employed to provide the charging current in order to render the system independent of batteries, which need periodic attention whether the system is in use or not, or external sources of electrical supply.

One object of the invention is to provide a compact unit from which a number of electroscopes, such for example as the dosimeters employed in atomic research laboratories, can be consecutively charged without the necessity of operating the generator whilst such charging is taking place or indeed between consecutive charges. A further object is to provide a charging system from which the indicating elements of electroscopes can be controllably charged or discharged to any desired extent within the range of voltage of the system.

According to the invention a charging system for electroscopes comprises a generator, a reservoir condenser one side of which is "earthed" with respect to the generator and which is charged by the latter, means for disconnecting said condenser from the generator when charged, a second condenser one side of which is "earthed" with respect to the generator and the opposite side of which is connected to the charging point of the system, and means permitting portions of the charge induced in the reservoir condenser to be incrementally transferred to said second condenser.

If desired, the generator may be hand-driven and supply alternating current, in which case a rectifier is interposed between the generator and the reservoir condenser.

Figure 1:
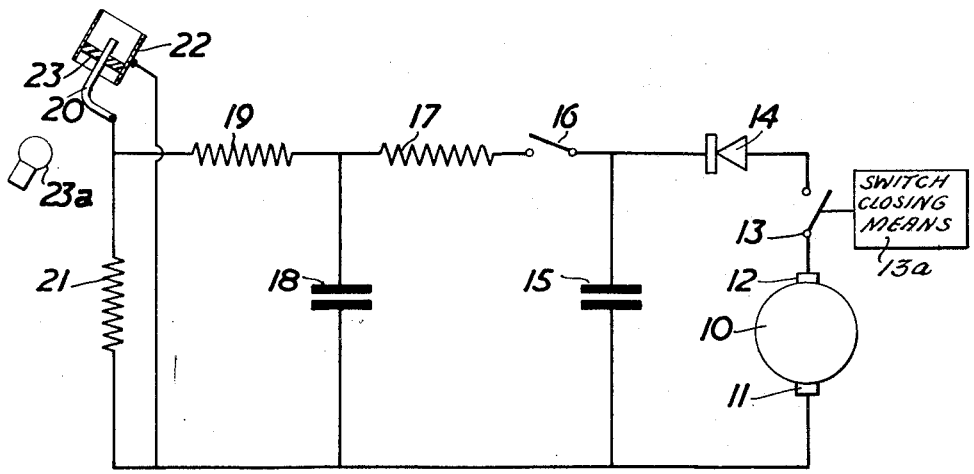
Figure 2:
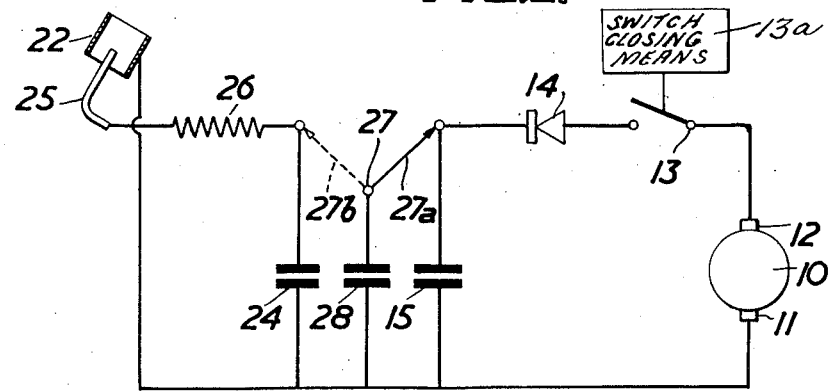
Figure 3:
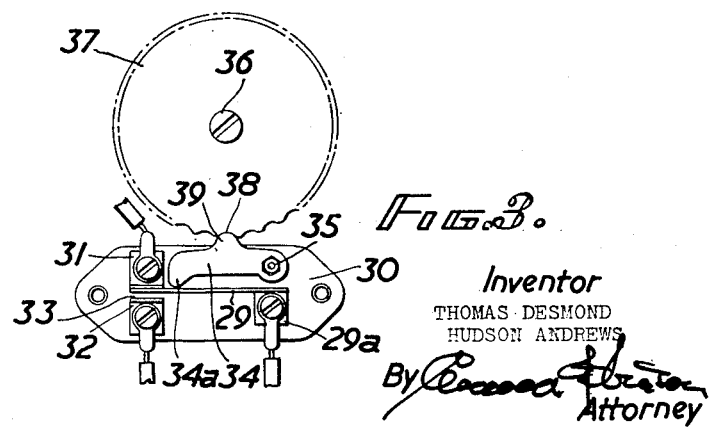

Two embodiments of the invention intended for charging dosimeters of the aforesaid character will now be described, by way of example, with reference to the accompanying drawings, in which:

Figure 1 illustrates in diagrammatic form a circuit in which portions of the charge in the reservoir condenser are transferred to the second condenser by means of a switch, Figure 2 illustrates an alternative circuit in which an additional condenser is incorporated in the switch means by which portions of the charge are transferred, and Figure 3 illustrates a preferred form of switch for use in the circuit shown in Figure 2.

Referring to Figure 1 of the drawings, a hand-driven alternating current generator 10 is provided, the negative side 11 of which forms the earth for the circuit. The positive side 12 of the generator is connected, by way of a switch 13, to a rectifier 14 and thence to one side of a reservoir condenser 15 of relatively large capacity, for example 1.0 mfd., the opposite side of which is earthed. Means 13a are provided whereby the switch 13 is closed only during operation of the generator and is automatically opened at the conclusion of such operation or when the voltage generated falls below a predetermined value, the switch being, for example, of the centrifugally or torque operated type. Thus the reservoir condenser 15 is charged during operation of the generator and is disconnected therefrom at the conclusion of the charging operation to prevent any possible leakage of the charge back to earth through the rectifier and generator windings.

From the positive side of the reservoir condenser 15 current is led by means of a second switch 16, preferably of the push-button on-off variety, by way of a high resistance 17 of 10 megohms for example, to one side of a second condenser 18 of considerably less value, for example .01 mfd., than the reservoir condenser, the opposite side of this second condenser being connected to earth. Thus by pressing the push-button switch 16 the second condenser 18 can be charged from the reservoir condenser 15 through the resistance 17. The positive side of the second condenser 18 is connected, through a high resistance 19 of approximately 100 megohms, to the charging point of the system which is constituted by a pin 20. The extent of the charging of the second condenser 18 by the push-button switch 16 is rendered controllable by the introduction of a time lag into the system, a resistance 21 having a considerably higher value, for example of the order of 500 megohms, than the resistances 17, 19 when combined being arranged across the plates of the second condenser. Thus each time the push-button switch 16 is operated and immediately released, a small portion of the charge contained in the reservoir condenser 15 is transferred to the second condenser 18 which is, therefore, charged in a series of incremental steps at a comparatively low rate until the required voltage is reached. When the switch 16 is left open for any considerable period this charge in the second condenser 18 gradually leaks to earth through the resistance 21 so that the voltage of the second condenser gradually falls to zero. Since the charged side of the second condenser 18 is connected to the charging pin 20 of the apparatus operation of the push-button switch 16 enables a dosimeter to be gradually charged until the indicating element thereof, which usually consists of a fine quartz fibre, moves across the instrument scale to the zero position.

The charging pin 20 is surrounded by an annular element or socket 22 into which one end of the case of the dosimeter can be fitted, such element being connected to earth so that the case of the dosimeter is earthed whilst its charging pin is in contact with the charging pin 20 of the apparatus. If desired, the intervening material between the charging pin of the apparatus and the annular element may be such that a very small electrical leakage takes place between the charging pin and the annular element, the material thus taking the place of the resistance 21. As shown at 23 in Figure 1, a disc of such material and of a translucent or transparent nature may be secured in the socket 22 and have a central aperture to carry the charging pin 20, illuminating means 23a being arranged on the side of the disc opposite the free end of the charging pin. Thus the dosimeter can be engaged with the charging pin and the scale of the former illuminated whilst charging is taking place.

When the push-button switch 16 is operated with a dosimeter applied to the apparatus the indicating element of the dosimeter moves across the scale of the latter towards the zero position, the dosimeter being removed from contact with the charging pin of the apparatus when such position is reached. It will be understood that intermittent operation of the switch 16 will cause the second condenser 18 to be charged by increments, in consequence of which the indicating element of the dosimeter will move towards the zero position in a step-by-step manner. Should the necessary charge be inadvertently exceeded the indicating element will move beyond the zero position but by releasing the push-button switch 16 and holding the dosimeter in position on the apparatus the slow leakage through the resistance 21 will enable the dosimeter to be discharged until the indicating element returns exactly to the zero position.

Figure 2 illustrates an alternative arrangement of the charging system in which alternating current is supplied by means of a hand-driven generator 10 through a centrifugally or torque operated switch 13 and rectifier 14 to a reservoir condenser 15 as in the previously described embodiment. One side of a second condenser 24 is connected to the charging pin 25 of the system by way of a resistance 26 of approximately 10 megohms whilst the other side of this condenser is connected to earth, the capacities of the two condensers 15, 24 being 1.0 mfd. and .10 mfd. respectively. Portions of the charge in the reservoir condenser 15 are fed by increments to the condenser 24 by means of a two-way switch 27, the three connections of which are respectively connected to the unearthed sides of the reservoir condenser 15, the condenser 24 and a third condenser 28 of considerably less capacity, for example .002 mfd., than either of the other condensers.

It will be appreciated that when the switch 27 is in the position shown in full lines at 27a a portion of the charge in the reservoir condenser 15 will flow into the condenser 28, the voltage of the charged portion of which will rise, in consequence, to that of the reservoir condenser. When the switch 27 is moved to the position shown in broken lines at 27b the charged side of the condenser 28 is disconnected from the reservoir condenser 15 and is connected to the condenser 24 and charging pin 25, the potential of these latter rising and that of the condenser 28 falling until all three are at the same potential. Due, however, to the difference in the capacities of the two condensers 24, 28 the potential of the condenser 24 will only rise by a small amount each time the switch 27 is operated, and when the dosimeter is applied to the charging pin 25 the instrument can be charged in a step-by-step manner until the indicating element of the dosimeter reaches the zero position.

Preferably, the switch 27 is constructed in the manner shown in Figure 3 although such a form of construction is not essential. A blade spring 29 is secured by an ear 29a formed at one of its ends to a base 30 of insulating material, the free end of the spring normally pressing against a contact 31. A second contact 32 is arranged adjacent the contact 31 so that a gap 33 is left between the contacts in which the free end of the spring 29 lies so that lateral movement of this end of the spring will break the connection between the contact 31 and the ear 29a and will connect the latter to the contact 32. Such lateral movement of the spring 29 is effected by a lever 34 mounted on a pivot 35 secured to the base 30, the free end of the lever having a protruding lug 34a which bears against the spring. Mounted closely adjacent to the switch on a pivot 36 is a circular disc 37 of insulating material having serrations 38 formed around its periphery, a tooth 39 formed on the lever 34 being pressed against the serrated disc by the spring 29.

The spacing of the disc 37 from the base 30 is such that when the free end of the spring 29 presses against the contact 31 the tooth 39 is urged into one of the troughs of the serrations 38, as shown in Figure 3. By turning the disc 37 in either direction so that the tooth 39 is forced outwardly by the crest adjacent to the trough of the serration in which it lies, the lever 34 pivots away from the disc and moves the free end of the spring 29 away from the contact 31 and into engagement with the contact 32. Thus, as each crest of a serration of the disc 37 passes the tooth 39, electrical connection between the ear 29a and the contact 31 is broken and the ear is connected, as the tooth rides over the crest, to the contact 32. When the switch is installed in the circuit shown in Figure 2 the ear 29a is connected to the condenser 28, the contact 31 is connected to the reservoir condenser 15 and the contact 32 to the condenser 24 and charging pin 25. The disc 37 can be readily moved in a step-by-step manner by applying a finger thereto, each movement of the disc causing a portion of the charge in the reservoir condenser 15 to be passed to the condenser 24 and charging pin 25.

I claim:

1. A charging system for delivering small metered charges of electricity to electroscopes to enable such electroscopes to be controllably charged to a required voltage, said system comprising, in combination, a hand-driven alternating current generator, a reservoir condenser one side of which is "earthed" in common with one side of the generator, a connection including a rectifier and switch means connected in series between the unearthed side of the generator and the unearthed side of the reservoir condenser, a second condenser of smaller capacity than the reservoir condenser, one side of said second condenser being "earthed" with respect to the generator, a charging point to which the unearthed side of said second condenser is connected, and charge transferring means including a hand-operated switch interposed between the unearthed sides of said reservoir condenser and said second condenser, said hand-operated switch being operative to transfer a portion of the charge induced in the reservoir condenser gradually to the unearthed side of said second condenser and therefore to said charging point.

2. A charging system for delivering small metered charges of electricity to electroscopes to enable such electroscopes to be controllably charged to a required voltage, said system comprising, in combination, a hand-driven alternating current generator, a reservoir condenser one side of which is "earthed" in common with one side of the generator, a connection including a rectifier and switch means connected in series between the unearthed side of the generator and the unearthed side of the reservoir condenser, a second condenser of smaller capacity than the reservoir condenser, one side of said second condenser being "earthed" with respect to the generator, a charging point, a high resistance connection between the unearthed side of the second condenser and the charging point, charge transferring means including a hand-operated switch interposed between the unearthed sides of said reservoir condenser and said second condenser, said hand-operated switch being operative to transfer a portion of the charge induced in the reservoir condenser gradually to the unearthed side of said second condenser and therefore to said charging point, and a time lag resistance of higher value than that of said high resistance connection, the time lag resistance being connected across said second condenser to cause any charge therein to fall slowly to zero when said switch of the charge transferring means is inoperative.

References Cited in the file of this patent

UNITED STATES PATENTS

| | | |
|---|---|---|
| 1,762,811 | Charlton | June 10, 1930 |
| 1,927,676 | Bedford | Sept. 19, 1933 |
| 1,944,072 | Fitzgerald | Jan. 16, 1934 |
| 2,078,792 | Fitzgerald | Apr. 27, 1937 |
| 2,110,015 | Fitzgerald | Mar. 1, 1938 |
| 2,327,791 | Hopper | Aug. 24, 1943 |
| 2,381,250 | Baumann | Aug. 7, 1945 |
| 2,395,600 | Weisglass | Feb. 26, 1946 |
| 2,425,767 | Vang | Aug. 19, 1947 |
| 2,473,344 | McCown | June 14, 1949 |
| 2,511,868 | Newsom | June 20, 1950 |
| 2,523,027 | Kellogg et al. | Sept. 19, 1950 |
| 2,531,220 | Kaplan | Nov. 21, 1950 |